United States Patent [19]

Mason

[11] 4,411,176
[45] Oct. 25, 1983

[54] ASSEMBLY FOR INSTALLING CHAINS

[76] Inventor: Lonnie L. Mason, 2725 Canary Dr., Visalia, Calif. 93277

[21] Appl. No.: 222,497

[22] Filed: Jan. 5, 1981

[51] Int. Cl.$^3$ .............................................. B60C 27/06
[52] U.S. Cl. ..................................................... 81/15.8
[58] Field of Search ..................... 81/15.8; 152/213 R, 152/213 A

[56] References Cited

U.S. PATENT DOCUMENTS

| 3,408,884 | 11/1968 | Musgrove | 81/15.8 |
| 3,722,330 | 3/1973 | Smekens | 81/15.8 |
| 3,870,093 | 3/1975 | Driggers | 81/15.8 X |
| 3,896,687 | 7/1975 | Cloud | 81/15.8 |

FOREIGN PATENT DOCUMENTS

| 974156 | 9/1975 | Canada | 152/213 R |
| 309755 | 1/1956 | Switzerland | 152/213 R |

Primary Examiner—James G. Smith
Attorney, Agent, or Firm—Huebner & Worrel

[57] ABSTRACT

An assembly for installing chains or the like on dual wheels having corresponding outer peripheral surfaces and facing sidewalls, the assembly having a plate dimensioned for engagement with the outer peripheral surfaces of the dual wheels; a capturing member having at least one dimension greater than the distance between the sidewalls; an arm interconnecting the plate and the capturing member to mount the assembly on the wheels for rotation therewith with the plate in engagement with the outer peripheral surfaces of the wheels and the capturing member captured between the sidewalls; and pins mounted on the plate for releasably supporting chains in depending relation aligned with the wheels for installation thereon by rotation of the wheels.

5 Claims, 5 Drawing Figures

ASSEMBLY FOR INSTALLING CHAINS

BACKGROUND OF THE INVENTION

1. Field of the Invention

The present invention relates to an assembly for installing chains or the like and more particularly to such an assembly which is adapted to install chains on dual wheels such as those of trucks, buses and other large vehicles under even the most adverse of conditions.

2. Description of the Prior Art

The installation of chains on the wheels of vehicles to improve traction where snow or ice are encountered has long been known. Such installation is commonly a tedious, exhaustive and dirty procedure because of the necessity for crawling under the vehicle and moving the segments of chain about the periphery of the tire while pulling the ends sufficiently tight to permit their interconnection. It has, however, been known in the case of smaller automotive vehicles to employ wire clips which are snap fitted around the transverse periphery of the tire and to which an end of the chains is attached. Thereafter, the operator drives the vehicle forwardly to pull the chains about the periphery of the tire and permit fastening of the ends of the chains together.

Which such prior art devices can be employed on relatively small wheels, they are not suited to the installation of chains or large wheels such as those of trucks, buses or the like. The weight of the chains required for such wheels is often seventy-five pounds or more which is simply too great for conventional devices to support for installation in the manner described with respect to smaller vehicles.

Furthermore, the problems incident to the installation of chains or other vehicles are compounded in the case of such large wheel vehicles. Since the chains are normally to be installed on the driving wheels of such vehicles and since the driving wheels of such vehicles are normally of the dual type, the weight of the chains employed on such wheels is so great as to prevent installation by other than a person of considerable strength or by more than one person. In the case of trucks and buses, it is frequently necessary to install chains on several sets of dual wheels which, when using conventional procedures, can require up to an hour and a half by even a person experienced in the installation of such chains. In the case of both trucks and buses, it may be necessary for the driver to await the arrival of a crew for installing the chains. Since such vehicles frequently travel great distances passing into and out of mountainous areas where snow and ice are encountered, the problem of chain installation is of chronic proportions.

Therefore, it has long been known that it would be desirable to have an assembly for installing chains which is particularly well suited to the installation of chains on dual wheels rapidly, safely, securely and with minimal exertion.

SUMMARY OF THE INVENTION

It is therefore an object of the present invention to provide an improved assembly for installing chains which is adapted to the installation of chains on dual wheels.

Another object is to provide such an assembly which permits the operators of trucks, buses and the like to install chains on the dual wheels of their vehicles with little or no exertion and in a small fraction of the time required by conventional procedures.

Another object is to provide such an assembly which operates in conjunction with the wheels themselves to install chains thereabout and which can itself rapidly be installed and removed.

Another object is to provide such an assembly which can be employed in multiples to install chains on the dual wheels of a vehicle in a single operation.

Another object is to provide such an assembly which permits the rapid installation of chains under even the most adverse of conditions and which possesses the capability for adjusting to stresses applied thereto as a result of such conditions.

Another object is to provide such an assembly which is capable of use in installing even the heaviest of chains without exertion by the user or damage to the tires.

Another object is to provide such an assembly which is of such exceedingly strong and durable construction as virtually to preclude damage thereto over a long operational life.

Another object is to provide such an assembly which virtually insures that the chains are installed more tightly, uniformly and precisely than as heretofore been possible so as virtually to eliminate damage resulting from improperly installed chains.

Another object is to provide such an assembly which is quite compact and easy to store and which can be sold at a nominal price.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
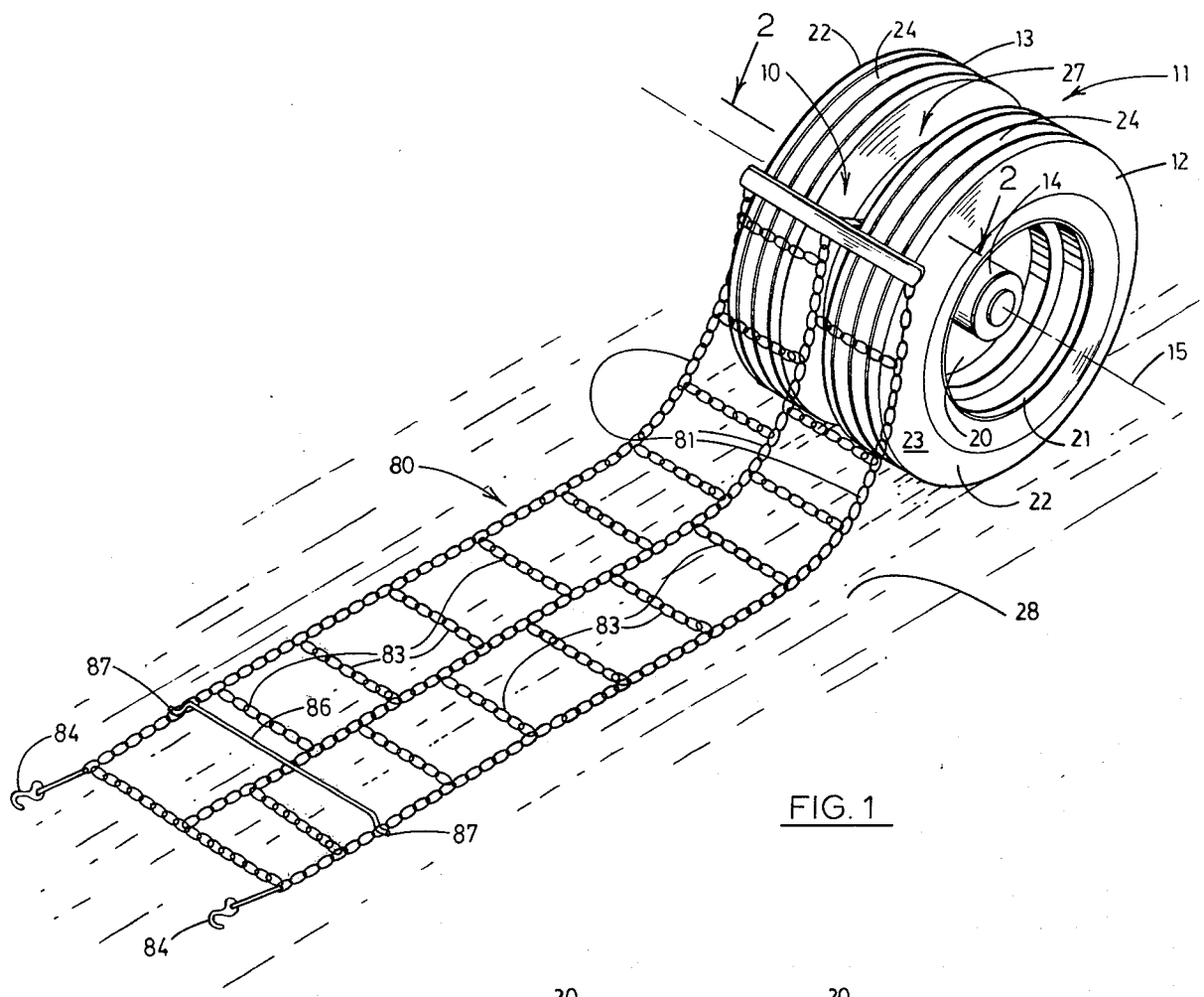
FIG. 1 is a perspective view of the assembly of the present invention shown in a typical environment.

Referring more particularly to the drawings, the assembly of the present invention is generally indicated by the numeral 10 in FIG. 1. As shown therein, the assembly is displayed in a typical operative environment mounted on dual wheels 11 such as are used on trucks, trailers, buses and the like. Such dual wheels include an outer wheel 12 and an inner wheel 13 disposed in side-by-side relation. The wheels are mounted on an axle and hub assembly 14 in the conventional manner for rotation about an axis of rotation 15.

Each of the wheels 12 and 13 has a wheel center 20 including a wheel rim 21 on which an inflated tire 22 is mounted in the conventional manner. Each tire has substantially convex sidewalls 23 which are joined by a peripheral or tread portion 24 extending circumferentially about the tire. As can best be seen in FIG. 2, the tread portion of each tire has an inner lateral edge 25 and an outer lateral edge 26. The tires of the dual wheels 11 are spaced from each other in side-by-side relation to define the space or passage 27 therebetween.

As shown in FIG. 1, the dual wheels are rested on a ground surface 28.

Figure 2:
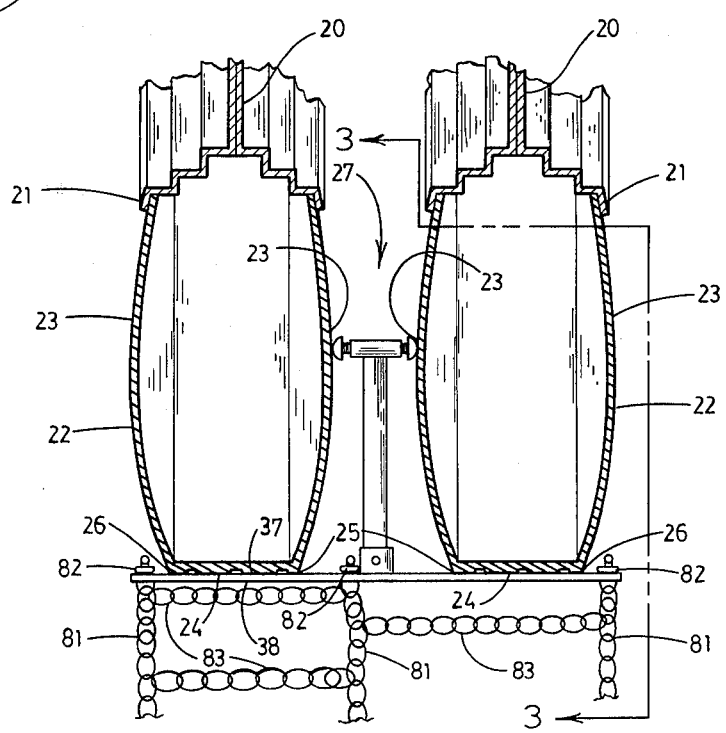
FIG. 2 is a somewhat enlarged fragmentary transverse section taken on line 2—2 in FIG. 1.

The assembly 10 of the present invention has a frame 35. The frame has a first portion or plate 36 which is preferably, although not necessarily, substantially flat and of metal or durable plastic construction. The plate has a first side 37 and an opposite, substantially parallel second side 38. The plate has opposite end portions 39 and is bounded by a lateral edge 40. The plate preferably has a length, as can be seen in FIG. 2, which is slightly greater than the distance between the outer lateral edges 26 of the tires 22.

Figure 4:
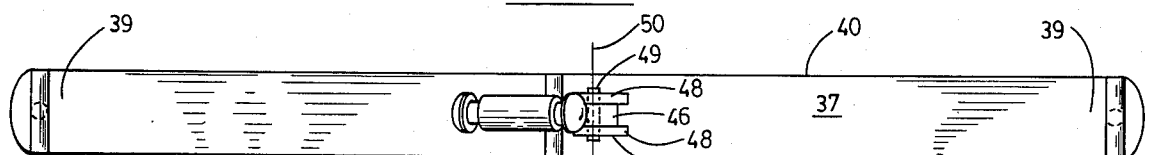
FIG. 4 is a top plan view of the assembly of the present invention.

The frame 35 has a second portion or arm 46 mounted on the first side 37 of the plate 36 substantially midway between the opposite end portions 39. The arm 46 is mounted in position by a clevis or mount 47 consisting of a pair of plates 48 mounted in upstanding relation on the first side 37 of the plate in spaced relation to each other and aligned longitudinally of the plate 36. A pin 49 is extended through and interconnects the plates 48 to define an axis of rotation 50 right angularly related to the plate 36, as best shown in FIG. 4. The arm has a distal end portion 51 which is mounted for pivotal movement on the pin 49 about the axis of rotation 50. The arm has a remote end portion 52.

Figure 5:
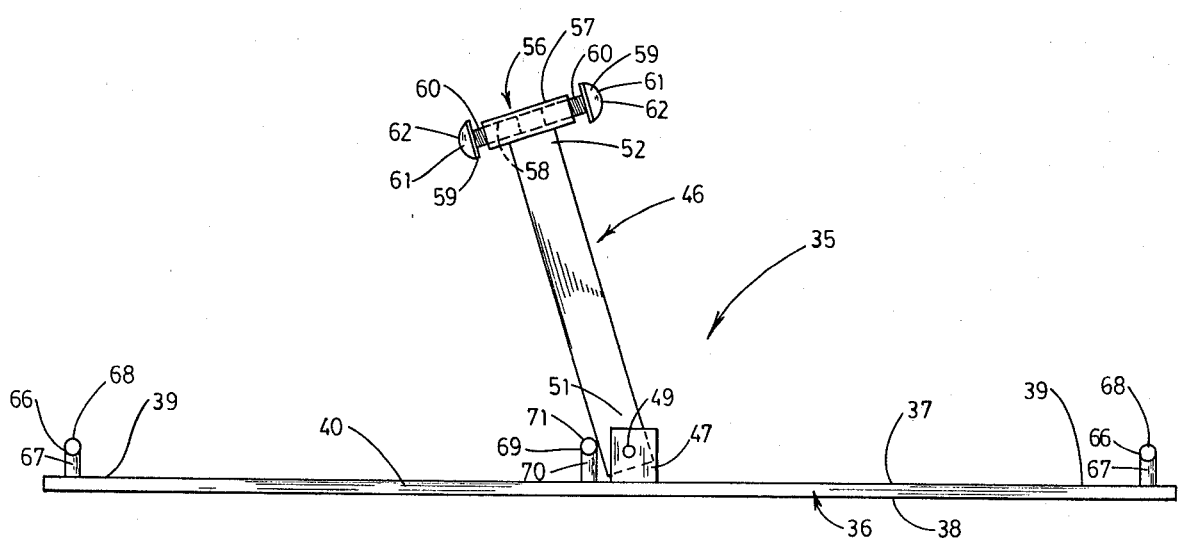
FIG. 5 is a side elevation of the assembly of FIG. 4.

The frame 35 has a third portion or capturing member 56 mounted, as by welding, on the remote end portion 52 of the arm 46, as best shown in FIG. 5. The capturing member includes a sleeve or coupling 57 having an internally screw threaded passage 58 extending therethrough. A pair of adjustment members or bolts 59 are individually, screw-threadably received in the opposite end portions of the passage 58. Each of the adjustment members has an externally screw threaded shaft portion 60, which is screw-threadably received in the passage 58 at its respective end thereof, and a head portion 61. The head portion preferably has a convex or hemispherical outer surface 62.

A pair of T-shaped pins 66 are individually mounted in upstanding relation on the opposite end portions 39 of the first side 37 of the plate 36. Each of the pins has an upright portion 67 which is substantially normal to the first side 37 and a cross portion 68 mounted in spaced relation to the first side 37 and extending substantially parallel to the axis of rotation 50, as best shown in FIG. 4. The length of the cross portion 68 is such as to permit it to pass through a link of the chains with which the assembly 10 is intended to be used, as will hereinafter be described in greater detail.

A T-shaped pin 69 is mounted on the first side 37 of the plate 36 in upstanding relation substantially centrally thereof. The pin is mounted in a predetermined position adjacent to the arm 46, as best shown in FIG. 5. The pin 69 has an upright portion 70 and a cross portion 71 substantially parallel to the cross portions 68 of the pins 66. The relationship between the arm and cross portion 71 of the pin 69 is preferably such that the arm can pivot toward the pin 69 a relatively short distance beyond right angular relation with respect to the plate 36, as best shown in FIG. 5.

The assembly 10 is operable to install a conventional set of chains 80 preferably of the type designed for installation on dual wheels 11. Such chains generally consist of three longitudinal strands or portions 81 having corresponding end links 82. The longitudinal portions 81 are interconnected by a plurality of transverse strands or portions 83. The ends of the longitudinal portions remote from the end links 82 mount clasps 84 adapted for attachment to the end links upon installation of the chains about the dual wheels.

It has been found convenient, although not necessary, to employ a wire spring 86 having end portions 87 shaped to engage the links of the outermost longitudinal portions 81 of the chains 80, as shown in FIG. 1, during installation of the chains.

OPERATION

Figure 3:
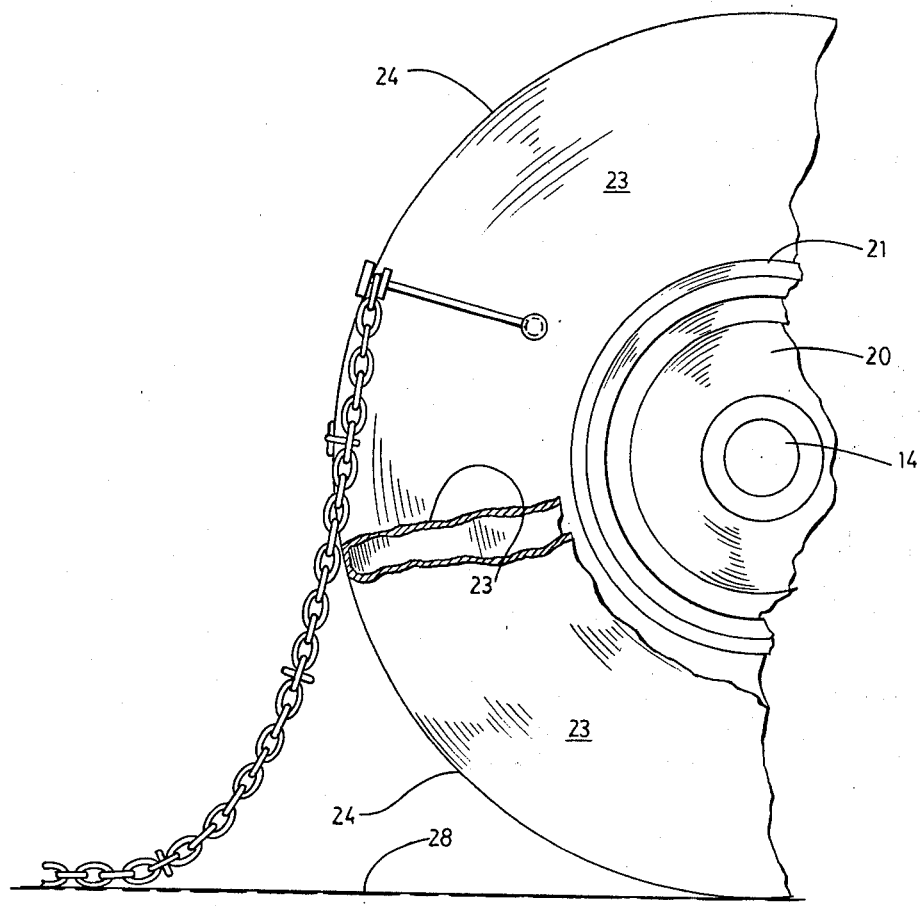
FIG. 3 is a fragmentary section taken on line 3—3 in FIG. 2.

The operation of the described embodiment of the subject invention is believed to be clearly apparent and is briefly summarized at this point. The frame 35 of the assembly 10 is simply and expeditiously installed by grasping the end portions 39 of the plate 36 and positioning it in a secondary or inserting attitude. This attitude can best be visualized by reference to FIG. 5 wherein the opposite end portion 39 of the plate 36 on the right, as viewed therein, is held above the opposite end portion so that the plate is held in a vertical attitude. This causes the arm 46 to pivot about the axis of rotation 50 into engagement with the cross portion 71 of the pin 69, as shown in FIG. 5. Thus, the arm is permitted to rotate a short distance beyond what would be a right angular relationship with respect to the plate. When held in this position, the arm is inserted through the space 27 between the sidewalls 23 of the tires 22 until the capturing member 56 is beyond the point of closest approach of the convex sidewalls 23. Thereafter, the plate is rotated ninety degrees to a primary attitude shown in FIGS. 1, 2 and 3. In the primary attitude the plate 36 is substantially parallel to the axis of rotation 15 of the dual wheels 11. Such rotation causes the head portions 61 of the adjustment members 59 to be drawn into engagement with the convex sidewalls 23 of the tires 22, as best shown in FIG. 2. The first side 37 of the plate 36 is similarly moved into engagement with the tread portions 24 of the tires. This action binds and thus mounts the frame 35 securely on the tires, as shown in FIG. 2. It has been found that the engagement of the hemispherical surfaces 62 of the head portions 61 with the resilient rubberized sidewalls 23 of the tires achieves a binding effect capturing the tires between the plate 36 and the capturing member 56. As a result, the plate is securely mounted in position on the tires.

Adjustment to individual tire shapes and sizes can be accommodated in several respects. The plate 36 can, when positioned in the primary attitude, be pulled outwardly from the tread portions 24 to draw the head portions 61 of the adjustment members into engagement with the sidewalls 23. While this draws the plate 36 away from the tread portions, when such engagement of the head portions has been achieved, the plate can be forced downwardly against the tread portions to bind the plate in position such as can be visualized in FIG. 3.

Alternatively, or in conjunction with such adjustment, the adjustment members 59 can be screw threaded inwardly or outwardly of the internally screw threaded passage 58 of the sleeve 57 to adjust to the different shapes and sizes of the tires involved. In either case, it has been discovered that once the binding effect has been achieved, the plate 36 is so securely mounted on the tires 22 as to be capable of supporting tremendous weight without becoming dislodged.

Furthermore, the pivotal mounting of the arm 46 for movement beyond a right angular relation with respect to the plate allows it to adjust to uneven surfaces encountered during installation and permitting it to become centered in more nearly right angular relation, as shown in FIG. 2, upon achieving the binding effect as desired. This also accommodates shifting of the tires relative to each other during rotation of the dual wheels in installation of the chains as will hereinafter be described. In addition, since the T-shaped pin 69 retains the arm in an extended position even when in the secondary attitude, the arm is prevented from simply pivoting further and into engagement with the plate.

When the assembly 10 has been installed on the dual wheels 11 as described, the chains 80 are attached to the assembly. This is achieved by positioning the end links 82 of the longitudinal portions 81 over the pins 66 and 69, as shown in FIG. 2. The end links of the outer longitudinal portions 81 are individually slipped over the cross portions 68 of the pins 66 and supported on the upright portions 67 thereof. Similarly, the end link of the central longitudinal portion is slipped over the cross portion 71 of the pin 69 and supported on the upright portion 70 thereof. The chains are then extended downwardly over and in alignment with the dual wheels as shown in FIG. 1 and extended in rested relation on the ground surface 28 therebehind. The outer longitudinal portions are laterally disposed with respect to the outer lateral edges 26 of the tires 22 and in trailing relation thereto. The central longitudinal portion of the chains is arranged in alignment with and trailing relation to the space 27 between the tires. Under certain circumstances, it has been found to be of assistance to install the wire spring 86 on the chains remote from the tires, as shown in FIG. 1. The end portions 87 thereof are individually snapped into engagement with links of the outer longitudinal portions 81 of the chains compressing the wire spring and keeping the chains in a "spread" condition.

Subsequently the vehicle, not shown, mounting the dual wheels 11 is driven forwardly to draw the chains 80 in a clockwise direction, as viewed in FIG. 1, and about the dual wheels. Such forward motion is continued until the plate 36 presses under the tires 22 and reaches a position a short distance above the ground surface 28. At that point the clasps 84 of the chains 80 are held by gravity in close proximity to their corresponding end links 82 attached to the pins 66 and 69 of the assembly. The end links are then individually removed from their respective pins and dropped on the ground surface 28. The weight of the dual wheels on the chains coupled with the force of gravity maintains the chains in position extending about the dual wheels.

The assembly 10 is then removed from the dual wheels 11 by moving the plate 36 to the vertical, secondary attitude and withdrawing the plate 36 from the tread portions 24 of the tires and the arm 46 from the space 27 between the tires. It has been found that although the plate in the installed primary attitude is securely held in position on the tires, it is easily freed therefrom by moving the plate to the secondary attitude. It is believed the hemispherical surfaces 62 of the adjustment members 59 assist in achieving this operative effect. Once the assembly 10 has been removed from the dual wheels 11, the end links 82 of the chains are simply individually fastened on their respective clasps 84 and the wire spring 86, if used, removed from the chains. This completes installation of the chains on the dual wheels.

Two or more of the assemblies 10 can be employed simultaneously to install chains 80 on all of the sets of dual wheels 11 of a vehicle if desired. The assemblies are installed on the dual wheels in each case as already described and extended about the sets of dual wheels during the same act of moving the vehicle forward as described.

Alternatively, the assembly 10 can be installed on a set of dual wheels 11 as described, but positioned on the front side of the dual wheels adjacent to the ground surface 28. The chains 80 are then installed on the pins 66 and 69 and laid on the ground surface ahead of the path of forward movement so that forward movement of the dual wheels causes the dual wheels to pass over and along the chains. Thus, the chains are carried about the dual wheels in the same clockwise direction as would be the case if viewed in FIG. 1. The assembly is then removed, as described, and the clasps 84 attached to the end links 82 to complete the installation. It will be apparent that, if desired, both processes can individually be employed for installing the chains on several sets of dual wheels.

The embodiment of the invention shown and described herein is the preferred form of the invention. However, it can be constructed in other forms as well. For example, the assembly 10 can employ a steel cable in place of the arm 46 with the capturing member 56 mounted on the end thereof. The cable is sufficiently rigid to support itself when the plate is in the secondary attitude while being sufficiently flexible to adjust to variations in the attitudes and positions of the wheels 12 and 13 of the dual wheels 11. Alternatively, the plate can mount a chain in place of the arm 46 and the capturing member 56 on the remote end thereof. Insertion of the capturing member can be accomplished by positioning the plate 36 on the top of the tires 22 and dangling the capturing member through the space 27 between the tires 22. By pulling upwardly on the plate, the capturing member is drawn into engagement with the side walls 23 of the tires and by then pulling the plate downwardly into engagement with the tread portions 24 of the tires the assembly can be secured in position.

In any case, the assembly 10 of the present invention reduces the time required to install chains on the dual wheels of vehicles to a small fraction of the time required by conventional procedures. It does so while requiring little physical exertion on the part of the person installing the chains, without risk of injury and under clean working conditions. Further, the assembly insures that the chains are correctly installed.

Therefore, the assembly of the present invention permits the installation of the chains on dual wheels rapidly, safely, securely, with minimal exertion and with a precision insuring that the chains operate most effectively.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An assembly for installing chains or the like on dual wheels rotational about an axis of rotation and having circumferentially extending treads and juxtaposed substantially curved sidewalls, the assembly comprising a frame having a first portion dimensioned for engagement with the treads of both wheels when disposed in a primary attitude in contact with the treads substantially parallel to the axis of rotation of the wheels, a second portion deployed for extension between the sidewalls of the wheels and a third portion borne by the second portion in spaced relation to the first portion and dimensioned for engagement with the sidewalls of the wheels when the first portion is disposed in said primary attitude to bind the frame on the wheels with said wheels captured between the first and third portions of the frame, said third portion of the frame having convex surfaces which face and engage the sidewalls of the dual wheels when the first portion of the frame is disposed in said primary attitude and the third portion of the frame being adjustable to move said convex surfaces toward or from each other; and means borne by the frame for supporting chains in depending relation thereon.

2. An assembly for installing chains or the like on a pair of wheels mounted in side-by-side relation for rotational movement about a common axis of rotation and including tires with circumferentially extending tread portions and substantially convex sidewalls disposed in juxtaposition bounding a space between said tires, the assembly comprising an elongated, substantially flat plate having opposite end portions and predetermined first and second sides; an arm mounted on the first side of the plate substantially midway between the end portions thereof for pivotal movement about an axis substantially normal to the plate and said arm having a width permitting it to pass through said space between the sidewalls and an end portion remote from said axis of pivotal movement; a coupling mounted on the remote end portion of the arm having laterally facing, internally screw threaded bores; a pair of adjustment members, having head portions, individually screw-threadably received in the bores for adjustable movement of the head portions thereof toward and from each other for individual engagement with the sidewalls of the tires with the plate disposed in a primary attitude engaging the tread portions of the tires substantially parallel to said axis of rotation of the wheels with the plate supported in said primary attitude by engagement of the plate and head portions with the tires; and means borne by the plate for releasably attaching chains thereon, when the plate is in the primary attitude, in depending relation aligned with said tires for installation thereon by rotation of the wheels about said axis of rotation.

3. The assembly of claim 2 wherein said head portions of the adjustment members have convex surfaces.

4. The assembly of claim 2 wherein said attaching means includes at least a pair of pins individually mounted on the first side of the plate at the opposite end portions thereof.

5. The assembly of claim 4 wherein the attaching means further includes a pin mounted on the first side of the plate adjacent to the arm and engagable by the arm by the force of gravity when the plate is disposed in a secondary attitude substantially normal to the axis of rotation of the wheels to support the arm in an extended attitude for passage through the space between the sidewalls.

* * * * *

UNITED STATES PATENT AND TRADEMARK OFFICE
CERTIFICATE OF CORRECTION

PATENT NO. : 4,411,176
DATED : October 25, 1983
INVENTOR(S) : Lonnie L. Mason

It is certified that error appears in the above-identified patent and that said Letters Patent is hereby corrected as shown below:

Column 1, Line 30, delete "or" and substitute ---on---.

Signed and Sealed this

Thirty-first Day of January 1984

[SEAL]

Attest:

GERALD J. MOSSINGHOFF

Attesting Officer

Commissioner of Patents and Trademarks